US007677968B2

(12) United States Patent
Schultz et al.

(10) Patent No.: US 7,677,968 B2
(45) Date of Patent: Mar. 16, 2010

(54) WAGERING GAME WITH SYMBOL COMBINATIONS PROVIDING VIRTUAL MAPPING TO TABLE WITH GAME OUTCOMES

(75) Inventors: Brad Schultz, Las Vegas, NV (US); Alfred Thomas, Las Vegas, NV (US)

(73) Assignee: WMS Gaming Inc., Waukegan, IL (US)

( * ) Notice: Subject to any disclaimer, the term of this patent is extended or adjusted under 35 U.S.C. 154(b) by 1030 days.

(21) Appl. No.: 11/361,285

(22) Filed: Feb. 23, 2006

(65) Prior Publication Data

US 2006/0189380 A1 Aug. 24, 2006

Related U.S. Application Data

(60) Provisional application No. 60/656,052, filed on Feb. 24, 2005.

(51) Int. Cl.
*A63F 13/00* (2006.01)

(52) U.S. Cl. ......................... 463/20; 463/18; 273/138.1

(58) Field of Classification Search ..................... 463/1, 463/10–13, 16–21, 23, 25–27, 29–34; 273/138.1, 273/138.2, 139, 141 A, 142 B, 142 C, 142 J, 273/148 R; *A63F 13/00*
See application file for complete search history.

(56) References Cited

U.S. PATENT DOCUMENTS 5,273,281 A 12/1993 Lovell
5,342,047 A 8/1994 Heidel et al.
5,393,057 A 2/1995 Marnell
5,472,196 A 12/1995 Rusnak
5,720,662 A 2/1998 Holmes, Jr. et al.
6,004,207 A * 12/1999 Wilson et al. ................. 463/20
6,027,115 A 2/2000 Griswold et al.

(Continued)

FOREIGN PATENT DOCUMENTS

EP 0933735 A2 8/1999

(Continued)

OTHER PUBLICATIONS

European Search Report for European Patent Application No. 04015383.51238 dated Apr. 6, 2005 (3 pages).

(Continued)

*Primary Examiner*—John M Hotaling, II
*Assistant Examiner*—Arthur O. Hall
(74) *Attorney, Agent, or Firm*—Nixon Peabody LLP

(57) ABSTRACT

A gaming machine for conducting a wagering game includes a display for displaying three or more reels, one having at least one triggering symbol representing a guaranteed award when it lands along an active payline selected by the player. When the triggering symbol lands along the selected payline, resulting in a triggering outcome, a corresponding outcome is retrieved from a table containing mappings of each triggering outcome with a corresponding outcome. The table is predetermined such that at the time the triggering outcome is presented to the player, the outcome is preordained. The outcome can further include another triggering symbol, in which case that winning outcome is further mapped to a retriggered winning outcome. In addition to mapping to each triggering outcome with a outcome, each outcome can be mapped to a game enhancement parameter.

23 Claims, 6 Drawing Sheets

U.S. PATENT DOCUMENTS

| | | | | |
|---|---|---|---|---|
| 6,056,642 | A | 5/2000 | Bennett | |
| 6,102,394 | A | 8/2000 | Wurz et al. | |
| 6,117,010 | A | 9/2000 | Canterbury et al. | |
| 6,120,031 | A * | 9/2000 | Adams | 273/292 |
| 6,126,542 | A * | 10/2000 | Fier | 463/16 |
| 6,142,873 | A * | 11/2000 | Weiss et al. | 463/20 |
| 6,190,254 | B1 | 2/2001 | Bennett | |
| 6,210,275 | B1 | 4/2001 | Olsen | |
| 6,251,013 | B1 | 6/2001 | Bennett | |
| 6,261,177 | B1 * | 7/2001 | Bennett | 463/16 |
| 6,261,178 | B1 | 7/2001 | Bennett | |
| 6,270,409 | B1 | 8/2001 | Shuster | |
| 6,270,411 | B1 | 8/2001 | Gura et al. | |
| 6,322,309 | B1 * | 11/2001 | Thomas et al. | 413/20 |
| 6,358,149 | B1 | 3/2002 | Schneider et al. | |
| 6,390,473 | B1 | 5/2002 | Vancura et al. | |
| 6,398,218 | B1 * | 6/2002 | Vancura | 273/138.1 |
| 6,454,649 | B1 | 9/2002 | Mattice et al. | |
| 6,491,584 | B2 | 12/2002 | Graham et al. | |
| 6,511,375 | B1 * | 1/2003 | Kaminkow | 463/20 |
| 6,517,433 | B2 | 2/2003 | Loose et al. | |
| 6,561,904 | B2 * | 5/2003 | Locke et al. | 463/25 |
| 6,592,457 | B1 * | 7/2003 | Frohm et al. | 463/16 |
| 6,652,378 | B2 * | 11/2003 | Cannon et al. | 463/20 |
| 6,656,040 | B1 * | 12/2003 | Brosnan et al. | 463/16 |
| 6,659,864 | B2 * | 12/2003 | McGahn et al. | 463/16 |
| 6,676,512 | B2 * | 1/2004 | Fong et al. | 463/20 |
| 6,811,483 | B1 * | 11/2004 | Webb et al. | 463/16 |
| 6,918,834 | B2 * | 7/2005 | Vancura | 463/25 |
| 7,001,273 | B2 * | 2/2006 | Baerlocher | 463/20 |
| 7,040,985 | B2 * | 5/2006 | Vancura | 463/20 |
| 7,048,275 | B2 * | 5/2006 | Adams | 273/292 |
| 7,169,047 | B2 * | 1/2007 | Benbrahim | 463/25 |
| 7,316,609 | B2 * | 1/2008 | Dunn et al. | 463/16 |
| 7,597,619 | B2 * | 10/2009 | Crivelli et al. | 463/20 |
| 7,614,947 | B2 * | 11/2009 | Baerlocher et al. | 463/16 |
| 2002/0036381 | A1 | 3/2002 | Scibetta | |
| 2002/0132660 | A1 * | 9/2002 | Taylor | 463/16 |
| 2002/0151345 | A1 | 10/2002 | Byrne | |
| 2002/0151346 | A1 * | 10/2002 | Devaull | 463/20 |
| 2003/0013519 | A1 * | 1/2003 | Bennett | 463/25 |
| 2003/0027616 | A1 * | 2/2003 | Vancura | 463/16 |
| 2003/0054878 | A1 | 3/2003 | Benoy et al. | |
| 2003/0087688 | A1 | 5/2003 | Kato | |
| 2003/0100360 | A1 | 5/2003 | Manfreidi et al. | |
| 2003/0119581 | A1 | 6/2003 | Cannon et al. | |
| 2003/0130025 | A1 * | 7/2003 | Gilmore et al. | 463/16 |
| 2003/0157978 | A1 * | 8/2003 | Englman | 463/16 |
| 2003/0162583 | A1 * | 8/2003 | Baerlocher et al. | 463/20 |
| 2004/0023707 | A1 * | 2/2004 | Maya et al. | 463/16 |
| 2004/0038725 | A1 | 2/2004 | Kaminkow | |
| 2004/0062025 | A1 | 4/2004 | Satoh et al. | |
| 2004/0092299 | A1 * | 5/2004 | Gauselmann | 463/16 |
| 2004/0242300 | A1 * | 12/2004 | Nicely et al. | 463/16 |

FOREIGN PATENT DOCUMENTS

| | | | |
|---|---|---|---|
| EP | 0933735 | A3 | 10/2003 |
| GB | 2 072 395 | A | 9/1981 |
| GB | 2 092 797 | A | 8/1982 |
| GB | 2 098 779 | A | 11/1982 |
| GB | 2 099 198 | A | 12/1982 |
| GB | 2 100 492 | A | 12/1982 |
| WO | WO 97/27568 | | 7/1997 |
| WO | WO 01/82245 | A2 | 11/2001 |
| WO | WO 01/82245 | A3 | 11/2001 |

OTHER PUBLICATIONS

European Search Report for European Patent Application No. 04015383.52221 dated Aug. 3, 2005 (3 pages).

* cited by examiner

WAGERING GAME WITH SYMBOL COMBINATIONS PROVIDING VIRTUAL MAPPING TO TABLE WITH GAME OUTCOMES

CROSS-REFERENCE TO RELATED APPLICATION

This application claims the benefit of U.S. Provisional Application No. 60/656,052, filed on Feb. 24, 2005, entitled "Wagering Game With Symbol Combinations Providing Virtual Mapping To Table With Game Outcomes," which is hereby incorporated herein by reference in its entirety.

COPYRIGHT

A portion of the disclosure of this patent document contains material which is subject to copyright protection. The copyright owner has no objection to the facsimile reproduction by anyone of the patent disclosure, as it appears in the Patent and Trademark Office patent files or records, but otherwise reserves all copyright rights whatsoever.

FIELD OF THE INVENTION

The present invention relates generally to gaming machines, and methods for playing wagering games, and more particularly, to a wagering game with triggering outcomes mapped in a table containing corresponding winning outcomes, such that when the triggering outcomes are presented to a player, the corresponding winning outcome has already been predetermined.

BACKGROUND OF THE INVENTION

Gaming machines, such as slot machines, video poker machines and the like, have been a cornerstone of the gaming industry for several years. Generally, the popularity of such machines with players is dependent on the likelihood (or perceived likelihood) of winning money at the machine and the intrinsic entertainment value of the machine relative to other available gaming options. Where the available gaming options include a number of competing machines and the expectation of winning at each machine is roughly the same (or believed to be the same), players are likely to be attracted to the most entertaining and exciting machines. Shrewd operators consequently strive to employ the most entertaining and exciting machines, features, and enhancements available because such machines attract frequent play and hence increase profitability to the operator. Therefore, there is a continuing need for gaming machine manufacturers to continuously develop new games and improved gaming enhancements that will attract frequent play through enhanced entertainment value to the player.

One concept that has been successfully employed to enhance the entertainment value of a game is the concept of a "secondary" or "bonus" game that may be played in conjunction with a "basic" game. The bonus game may comprise any type of game, either similar to or completely different from the basic game, which is entered upon the occurrence of a selected event or outcome in the basic game. Generally, bonus games provide a greater expectation of winning than the basic game and may also be accompanied with more attractive or unusual video displays and/or audio. Bonus games may additionally award players with "progressive jackpot" awards that are funded, at least in part, by a percentage of coin-in from the gaming machine or a plurality of participating gaming machines. Because the bonus game concept offers tremendous advantages in player appeal and excitement relative to other known games, and because such games are attractive to both players and operators, there is a continuing need to develop gaming machines with new types of bonus games to satisfy the demands of players and operators.

Gaming machines have utilized a variety of mechanisms to present various combinations of symbols, and to award prizes, money, or other awards associated with certain predefined winning combinations. Traditional slot machines, for example, utilize a plurality of reels (either mechanical, or simulated on a video display) and at least one payline, with certain combination of symbols landing on the payline constituting winning combinations for which awards are given to the player in accordance with a pay table. Video poker gaming machines offer an alternative wherein winning combinations correspond with traditional winning poker hands. However, traditional gaming machines fail to pre-associate triggering game outcomes with corresponding winning outcomes in a mapping table such that a player can accumulate winning outcomes during play and redeem the predetermined winning outcome at any time by exercising an option. Thus, a need exists for a gaming machine having a controller programmed to pre-associate triggering outcomes with corresponding winning outcomes before the winning outcomes are indicated to the player at the player's option. In addition, a need exists for a method of simplifying the math required to calculate awards where each triggering outcome has an award associated with it just as with any other winning outcome. The present invention is directed to satisfying one or more of these needs and solving other problems.

SUMMARY OF THE INVENTION

According to one aspect of the present invention, a method of conducting a wagering game on a gaming machine, includes associating outcomes with triggering game outcomes that cause the game outcomes to be accrued. Each of the triggering game outcomes are indicated to the player by a triggering symbol. The method further includes initiating the wagering game on the gaming machine upon detecting a wager from a player of the gaming machine. The initiating includes randomly selecting a game outcome from multiple game outcomes. After the associating, and in response to the randomly selected outcome being a first triggering outcome, the method further includes indicating the first triggering outcome that is associated with a corresponding first outcome. In response to an option exercised by said player, and after indicating the randomly selected game outcome, the method further includes displaying the corresponding first outcome based on the associating, which displaying may be carried out by a controller coupled to a video display of the gaming machine. According to a specific aspect of the invention, the outcome can be a winning or non-winning outcome.

According to another aspect of the invention, a method of conducting a wagering game on a gaming machine includes receiving a wager from a player to initiate game play on said gaming machine and associating triggering outcomes with respective outcomes, each triggering outcome being represented by a combination of reel stop positions that includes at least one triggering reel stop position. The method further includes displaying reels, wherein the reel stop positions represent virtual stop positions on each of the reels. The reels can be mechanical reels or video reels. After the associating, a first game outcome is presented to the player in response to an option exercised by the player.

According to yet another aspect of the invention, a computer readable storage medium is encoded with instructions for directing a gaming machine to perform the above methods.

According to still another aspect of the invention, a gaming terminal for playing a wagering game includes a wager-input device for receiving a wager from a player, a display for displaying symbols, and a special-event input device. The symbols indicate a randomly selected outcome selected from multiple outcomes, which include at least two triggering outcomes that award additional game play at a time selectable by the player. The additional game play provides a redeemable outcome. The special-event input device initiates the additional game play in response to the player activating the special-event input device. The redeemable outcome is predetermined before the player activates the special-event input device and is correlated to at least one of the symbols used for indicating the triggering outcome. According to a specific aspect of the invention, the redeemable outcome can be a winning outcome or a non-winning outcome or can represent a game enhancement parameter.

According to yet another aspect of the present invention, a method of conducting a wagering game on a gaming machine includes associating a plurality of possible triggering outcomes with respective accrued outcomes. The method further includes receiving a wager from a player to play the wagering game. After associating the plurality of possible triggering outcomes with respective accrued outcomes, the method further includes presenting one of the triggering outcomes. In response to an option exercised by the player, the method also includes presenting the accrued outcome associated with the presented triggering outcome.

Additional aspects of the invention will be apparent to those of ordinary skill in the art in view of the detailed description of various embodiments, which is made with reference to the drawings, a brief description of which is provided below.

DETAILED DESCRIPTION

Figure 1:
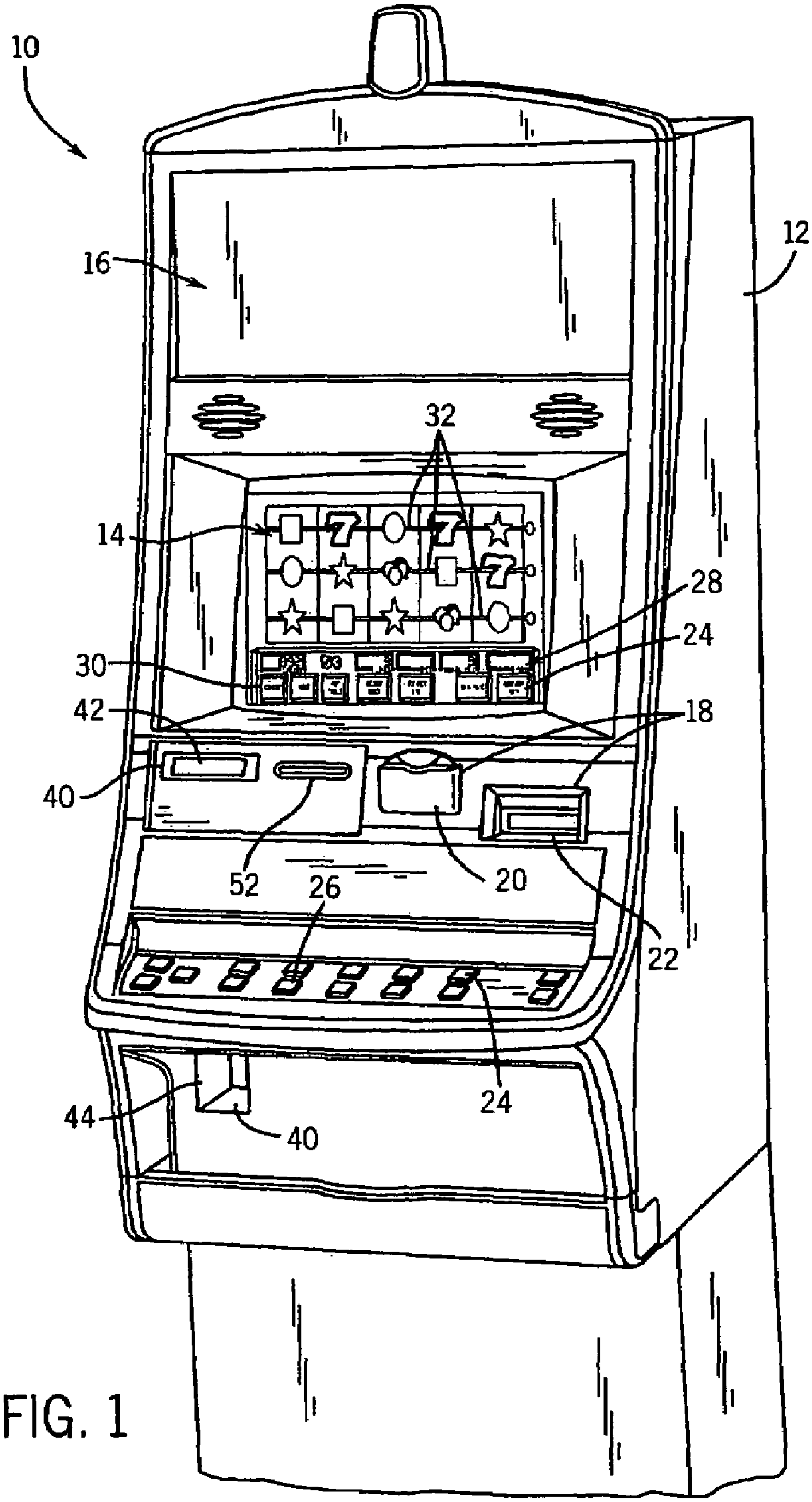
FIG. 1 is a perspective view of a gaming machine embodying the present invention.

While this invention is susceptible of embodiment in many different forms, there is shown in the drawings and will herein be described in detail preferred embodiments of the invention with the understanding that the present disclosure is to be considered as an exemplification of the principles of the invention and is not intended to limit the broad aspect of the invention to the embodiments illustrated.

Referring to FIG. 1, a gaming machine 10 is used in gaming establishments such as casinos. With regard to the present invention, the gaming machine 10 may be any type of gaming machine and may have varying structures and methods of operation. For example, the gaming machine 10 may be an electromechanical gaming machine configured to play mechanical slots, or it may be an electronic gaming machine configured to play a video casino game, such as blackjack, slots, keno, poker, blackjack, roulette, etc. Alternately, the gaming machine 10 may be a portable mobile device configured to play a video casino game.

The gaming machine 10 comprises a housing 12 and includes input devices, including a value input device 18 and a player input device 24. For output the gaming machine 10 includes a primary display 14 for displaying information about the basic wagering game. The primary display 14 can also display information about a bonus wagering game and a progressive wagering game. The gaming machine 10 may also include a secondary display 16 for displaying game events, game outcomes, and/or signage information. While these typical components found in the gaming machine 10 are described below, it should be understood that numerous other elements may exist and may be used in any number of combinations to create various forms of a gaming machine 10.

The value input device 18 may be provided in many forms, individually or in combination, and is preferably located on the front of the housing 12. The value input device 18 receives currency and/or credits which are inserted by a player. The value input device 18 may include a coin acceptor 20 for receiving coin currency (see FIG. 1). Alternatively, or in addition, the value input device 18 may include a bill acceptor 22 for receiving paper currency. Furthermore, the value input device 18 may include a ticket reader, or barcode scanner, for reading information stored on a credit ticket, a card, or other tangible portable credit storage device. The credit ticket or card may also authorize access to a central account, which can transfer money to the gaming machine 10.

The player input device 24 comprises a plurality of push buttons 26 on a button panel for operating the gaming machine 10. In addition, or alternatively, the player input device 24 may comprise a touch screen 28 mounted by adhesive, tape, or the like over the primary display 14 and/or secondary display 16. The touch screen 28 contains soft touch keys 30 denoted by graphics on the underlying primary display 14 and used to operate the gaming machine 10. The touch screen 28 provides players with an option on how to make their game selections. A player enables a desired function either by touching the touch screen 28 at an appropriate touch key 30 or by pressing an appropriate push button 26 on the button panel. The touch keys 30 may be used to implement the same functions as push buttons 26. Alternatively, the push buttons 26 may provide inputs for one aspect of the operating the game, while the touch keys 30 may allow for input needed for another aspect of the game.

The various components of the gaming machine 10 may be connected directly to, or contained within, the housing 12, as seen in FIG. 1, or may be located outboard of the housing 12 and connected to the housing 12 via a variety of different wired or wireless connection methods. Thus, the gaming machine 10 comprises these components whether housed in the housing 12, or outboard of the housing 12 and connected remotely.

The operation of the basic wagering game is displayed to the player on the primary display 14. The primary display 14 can also display the bonus game associated with the basic wagering game. The primary display 14 may take the form of a cathode ray tube (CRT), a high resolution LCD, a plasma display, an LED, or any other type of display suitable for use in the gaming machine 10. As shown, the primary display 14 includes the touch screen 28 overlaying the entire monitor (or a portion thereof) to allow players to make game-related selections. Alternatively, the primary display 14 of the gaming machine 10 may include a number of mechanical reels to display the outcome in visual associated to at least one payline 32. In the illustrated embodiment, the gaming machine

10 is an "upright" version in which the primary display 14 is oriented vertically relative to the player. Alternatively, the gaming machine may be a "slant-top" version in which the primary display 14 is slanted at about a thirty-degree angle toward the player of the gaming machine 10. In still alternate embodiments, the gaming machine may be a portable mobile device.

A player begins play of the basic wagering game by making a wager via the value input device 18 of the gaming machine 10. A player can select play by using the player input device 24, via the buttons 26 or the touch screen keys 30. The basic game consists of a plurality of symbols arranged in an array, and includes at least one payline 32 that indicates one or more outcomes of the basic game. Such outcomes are randomly selected in response to the wagering input by the player. At least one of the plurality of randomly-selected outcomes may be a start-bonus outcome, which can include any variations of symbols or symbol combinations triggering a bonus game.

In some embodiments, the gaming machine 10 may also include a player information reader 52 that allows for identification of a player by reading a card with information indicating his or her true identity. The player information reader 52 is shown in FIG. 1 as a card reader, but may take on many forms including a ticket reader, bar code scanner, RFID transceiver or computer readable storage medium interface. Currently, identification is generally used by casinos for rewarding certain players with complimentary services or special offers. For example, a player may be enrolled in the gaming establishment's loyalty club and may be awarded certain complimentary services as that player collects points in his or her player-tracking account. The player inserts his or her card into the player information reader 52, which allows the casino's computers to register that player's wagering at the gaming terminal 10. The gaming terminal 10 may use the secondary display 16 or other dedicated player-tracking display for providing the player with information about his or her account or other player-specific information. Also, in some embodiments, the information reader 52 may be used to restore game assets that the player achieved and saved during a previous game session.

Figure 2:
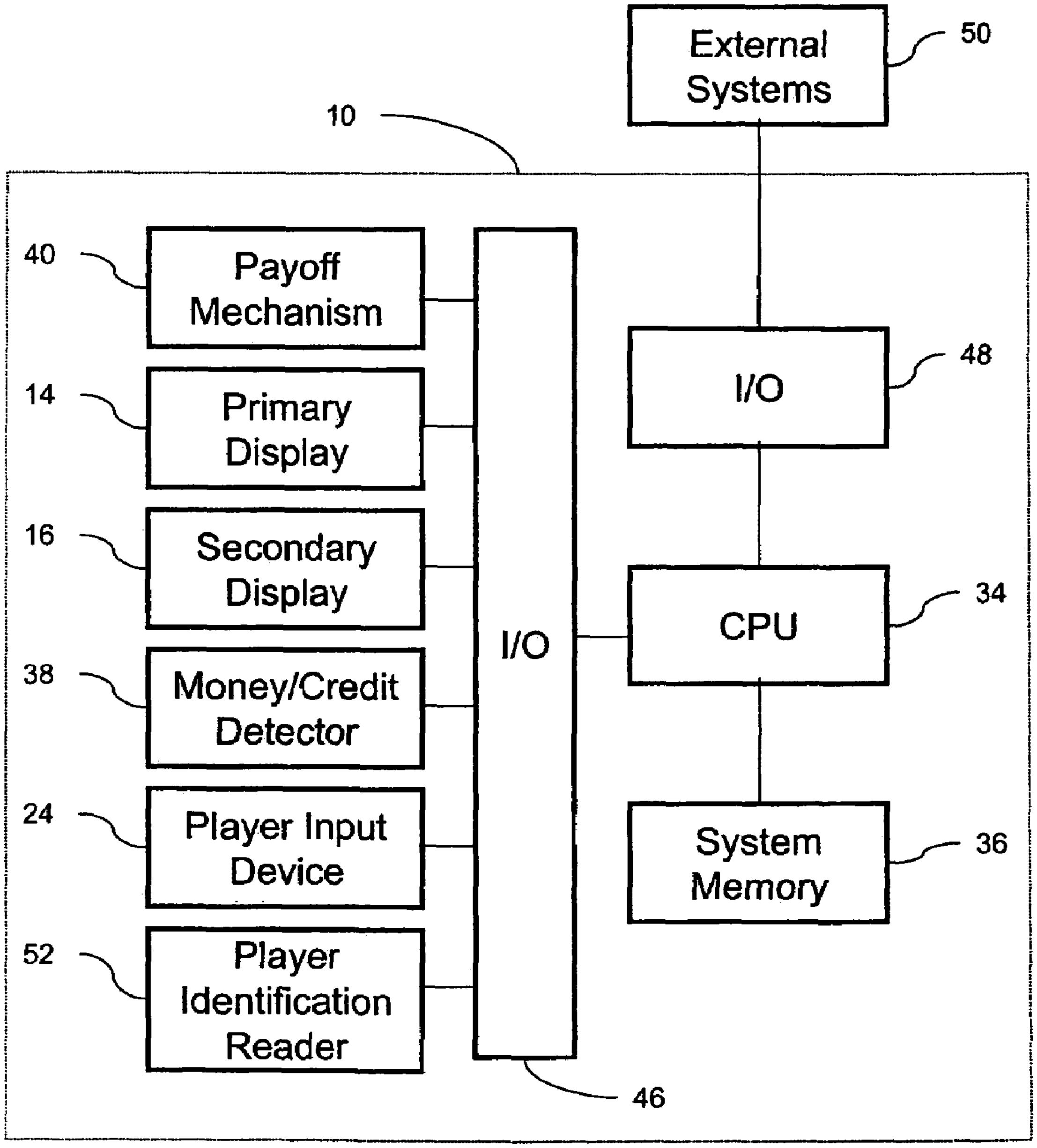
FIG. 2 is a block diagram of a control system suitable for operating the gaming machine.

Turning now to FIG. 2, the various components of the gaming machine 10 are controlled by a central processing unit (CPU) 34, also referred to herein as a controller or processor (such as a microcontroller or microprocessor). To provide gaming functions, the controller 34 executes one or more game programs stored in a computer readable storage medium, in the form of memory 36. The controller 34 performs the random selection (using a random number generator (RNG)) of an outcome from the plurality of possible outcomes of the wagering game. Alternatively, the random event may be determined at a remote controller. The remote controller may use either an RNG or pooling scheme for its central determination of a game outcome. It should be appreciated that the controller 34 may include one or more microprocessors, including but not limited to a master processor, a slave processor, and a secondary or parallel processor.

The controller 34 is also coupled to the system memory 36 and a money/credit detector 38. The system memory 36 may comprise a volatile memory (e.g., a random-access memory (RAM)) and a non-volatile memory (e.g., an EEPROM). The system memory 36 may include multiple RAM and multiple program memories. The money/credit detector 38 signals the processor that money and/or credits have been input via the value input device 18. Preferably, these components are located within the housing 12 of the gaming machine 10. However, as explained above, these components may be located outboard of the housing 12 and connected to the remainder of the components of the gaming machine 10 via a variety of different wired or wireless connection methods.

As seen in FIG. 2; the controller 34 is also connected to, and controls, the primary display 14, the player input device 24, and a payoff mechanism 40. The payoff mechanism 40 is operable in response to instructions from the controller 34 to award a payoff to the player in response to certain winning outcomes that might occur in the basic game or the bonus game(s). The payoff may be provided in the form of points, bills, tickets, coupons, cards, etc. For example, in FIG. 1, the payoff mechanism 40 includes both a ticket printer 42 and a coin outlet 44. However, any of a variety of payoff mechanisms 40 well known in the art may be implemented, including cards, coins, tickets, smartcards, cash, etc. The payoff amounts distributed by the payoff mechanism 40 are determined by one or more pay tables stored in the system memory 36.

Communications between the controller 34 and both the peripheral components of the gaming machine 10 and external systems 50 occur through input/output (I/O) circuits 46, 48. More specifically, the controller 34 controls and receives inputs from the peripheral components of the gaming machine 10 through the input/output circuits 46. Further, the controller 34 communicates with the external systems 50 via the I/O circuits 48 and a communication path (e.g., serial, parallel, IR, RC, 10bT, etc.). The external systems 50 may include a gaming network, other gaming machines, a gaming server, communications hardware, or a variety of other interfaced systems or components. Although the I/O circuits 46, 48 may be shown as a single block, it should be appreciated that each of the I/O circuits 46, 48 may include a number of different types of I/O circuits.

Controller 34, as used herein, comprises any combination of hardware, software, and/or firmware that may be disposed or resident inside and/or outside of the gaming machine 10 that may communicate with and/or control the transfer of data between the gaming machine 10 and a bus, another computer, processor, or device and/or a service and/or a network. The controller 34 may comprise one or more controllers or processors. In FIG. 2, the controller 34 in the gaming machine 10 is depicted as comprising a CPU, but the controller 34 may alternatively comprise a CPU in combination with other components, such as the I/O circuits 46, 48 and the system memory 36.

Figure 3:
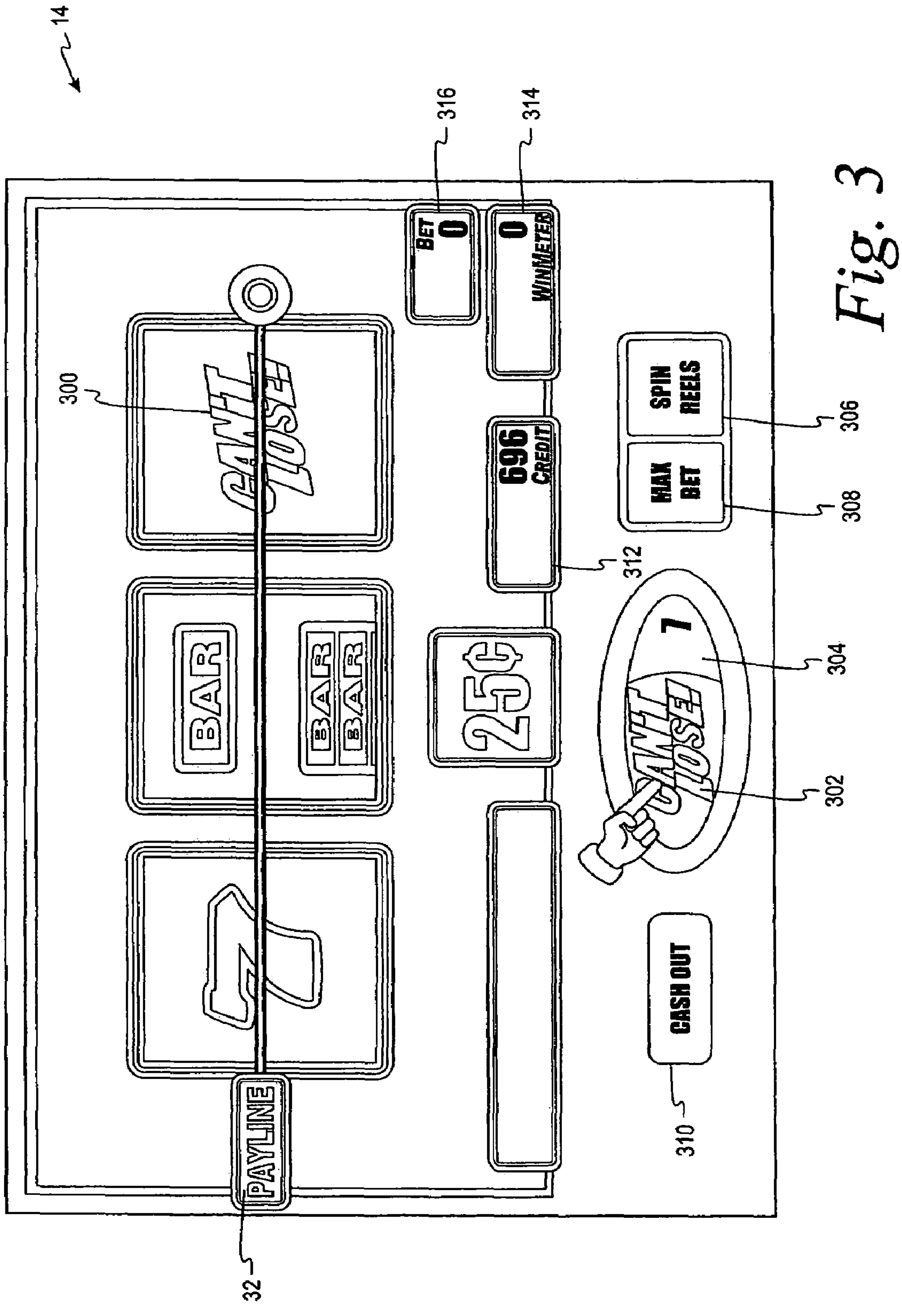
FIGS. 3-5 are exemplary visual reel display areas that can be displayed in accordance with the present invention.

Turning now to FIG. 3, an exemplary visual reel display area of the primary display 14 is shown. A special triggering symbol 300 having an exemplary feature name "Can't Lose" has stopped along the active payline 32, which is a payline upon which the player has made a wager. A counter display 304 has been incremented from 6 to 7, to indicate to the player that seven "Can't Lose" outcomes have now been accrued. The player can exercise an option at any time during play of the gaming machine 10 to redeem one or more accrued "Can't Lose" outcomes by selecting a bonus game button 302. When the option is exercised, the player is guaranteed of achieving a winning outcome of the "Can't Lose" play. As such, the "Can't Lose" outcome is an accumulated winning outcome whose indication is deferred to a later time. The bonus game button 302 can be a physical button or a virtual button in an embodiment in which the touch screen 28 is employed.

When the "Can't Lose" or guaranteed win triggering outcome is achieved, a corresponding winning outcome that has been pre-associated with the Can't Lose outcome is generated and an indication thereof stored in the system memory 36 or in a memory device in the external systems 50. The winning outcome is then indicated to the player at any time during play in response to the bonus game button 302 being activated. The player can accumulate multiple winning outcomes (the total number of which is displayed on the counter display 304 in an embodiment), and redeem them, one or more at a time, by exercising an option (such as by pressing the bonus game button 302) indicating a desire to redeem the winning outcome(s). Each time a "Can't Lose" outcome is achieved, data indicative of a corresponding winning outcome is stored in a memory, such as the memory 36 or a memory device in the external systems 50. In this manner, a mapping is generated for each "Can't Lose" outcome with a corresponding winning outcome.

In separate embodiments, the mapping can occur at any time at or before the triggering game outcome is accumulated. As used herein, a "Can't Lose" outcome is a guaranteed win triggering outcome, in the sense that the outcome associated with the "Can't Lose" outcome is a winning outcome as opposed to a non-winning outcome. The present invention contemplates that a triggering outcome in accordance with the embodiments described herein can be mapped to a winning outcome, a non-winning outcome, or another triggering (or retriggered, as explained below) outcome.

As is known, a reel can be conventionally divided up into a plurality of reel stop positions. For example, in FIG. 3, the space on the second reel between the bar and triple-bar corresponds to a (virtual) reel stop position. In an exemplary embodiment, there are four reel stop positions, in the third reel that have the triggering symbol 300, such that any one of the four reel stop positions lining up with the payline 32 results in a guaranteed win triggering outcome. For the three reels, each combination of reel stop positions that includes a reel stop position corresponding to the triggering symbol 300 is mapped to a winning outcome. For example, in FIG. 3, the triggering symbol 300 falls along the active payline 32 in the rightmost reel, and the symbol "7" falls along the active payline in the leftmost reel. The middle reel displays a space (or "blank" symbol) between a bar and triple-bar symbols. The reel stop positions corresponding to these symbols and space are mapped to a winning outcome. All other reel stop position combinations are mapped to conventional game outcomes, some of which are winning outcomes and others of which are non-winning outcomes. However, all of the winning outcomes are guaranteed to result in a payout award. In this manner, a player can accumulate numerous winning outcomes (without actually knowing what they are, even though they are "known" to the gaming machine 10 at the time of accrual), and redeem their associated awards at any time on any machine. Note that the present invention contemplates that the accrued winning outcomes can be redeemed on a machine other than the gaming machine on which they were accumulated.

For example, if the player is feeling down on his luck, the player can redeem some of his accumulated winning outcomes, boosting his morale and encouraging him to continue game play at the gaming machine 10. The player may also "perceive" that he has accumulated more credits than he has wagered because the counter display 304 provides a constant visual reminder to the player that he has accumulated winning outcomes that can be redeemed at any time, which correspond to an unknown (to the player) number of win credits. In accordance with the present invention, each winning outcome on the counter display 304 has already been predetermined, even as they are not yet revealed to the player.

Figure 4:
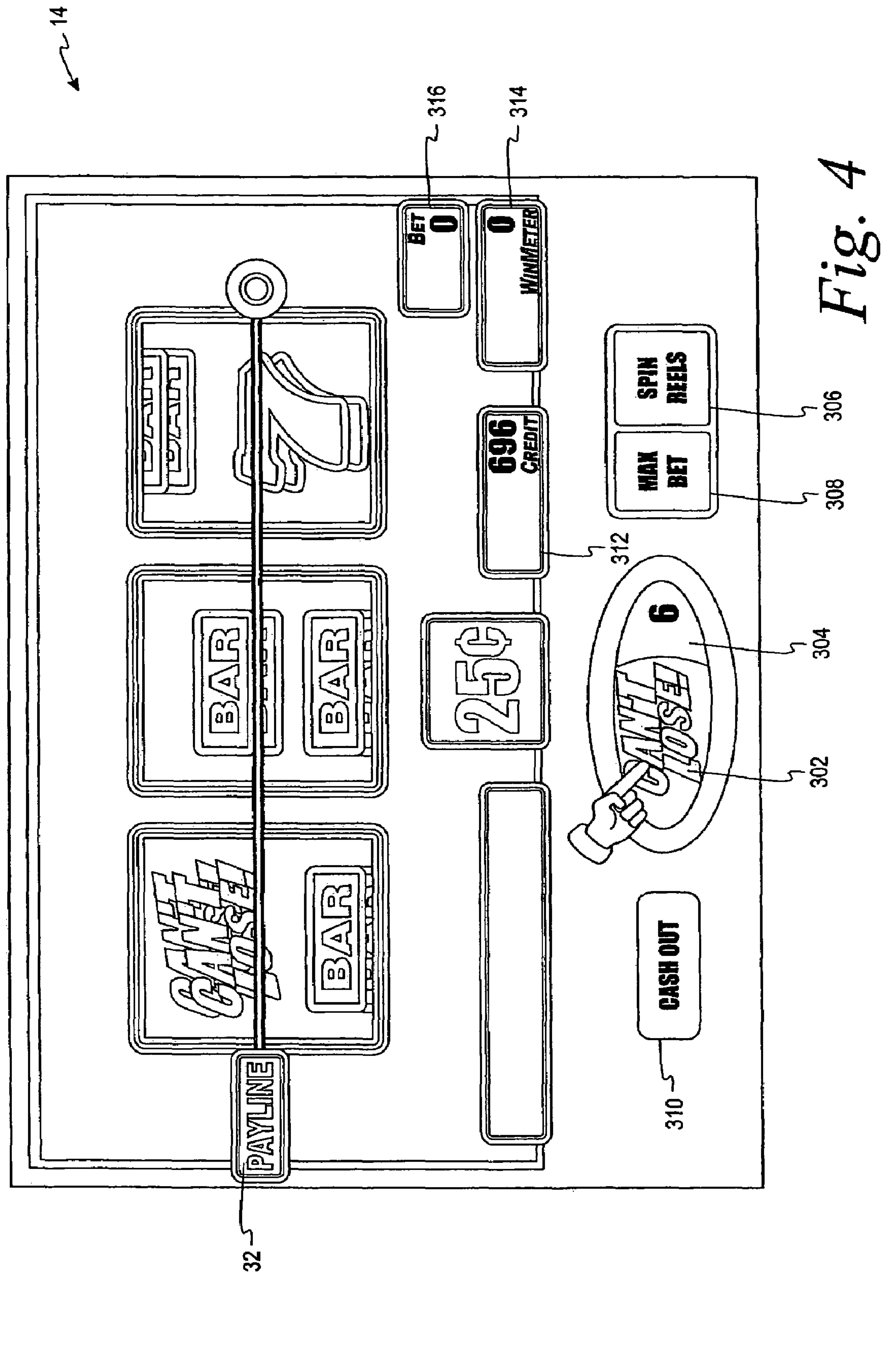

In FIG. 4, a player has decided to redeem one of the winning outcomes, and selects the bonus game button 302, which has a feature name "Can't Lose" or some other name or symbol that informs the player that the accumulated values reflect a guaranteed award. The reels are either spun mechanically or appear to spin virtually on a video display and stop at respective reel stop positions corresponding to the reel stop positions of the winning outcome that was determined when the player achieved the "Can't Lose" symbol (e.g., as shown in FIG. 3). In an embodiment, the winning outcomes are redeemed in a first-in-first-out (FIFO) order, or, stated another way, in the same order in which they were accrued. Thus, the first accumulated winning outcome is the first to be redeemed. In other embodiments, the winning outcomes can be redeemed in any predetermined (such as last-in-first-out or LIFO) or random or quasi-random order.

Figure 5:
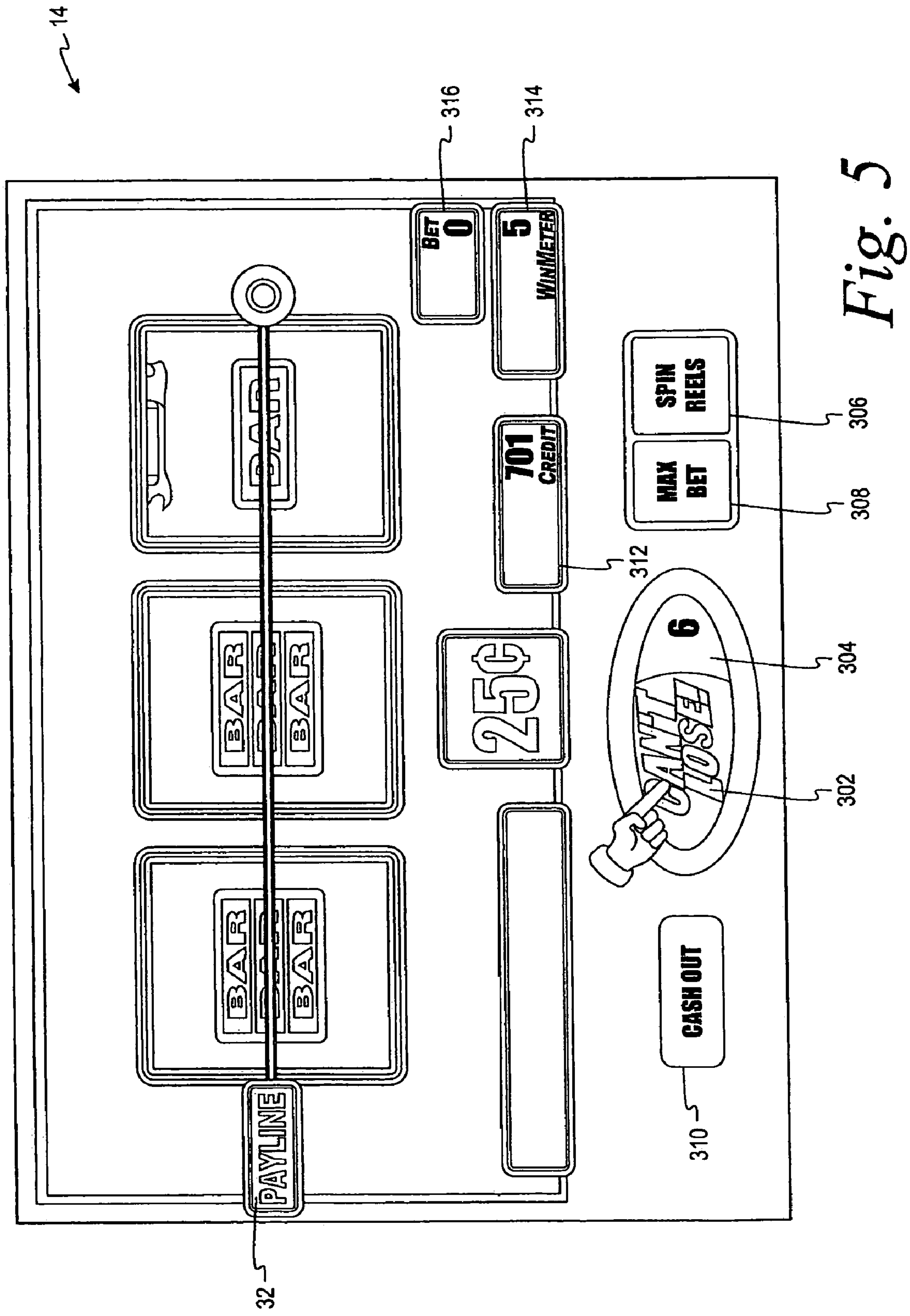

As shown in FIG. 4, the display counter 304 is decremented from seven to six to indicate to the player that there are now six remaining accumulated winning outcomes to be redeemed. The winning outcome is presented to the player as shown in FIG. 5 as triple-bar, triple-bar, single-bar. The triple-bar, triple-bar, single-bar outcome represents the pre-associated winning outcome corresponding to the "Can't Lose" outcome that caused it to be accumulated. As noted above, it is the reel stop positions that are actually used in an embodiment, not the symbols themselves, but for ease of discussion, the symbols are used to represent the outcome because that is what is visually apparent to the player.

The display counter 304 is incremented or decremented as winning outcomes are accrued or redeemed. In an embodiment, if the display counter 304 reaches 99, and another "Can't Lose" outcome is achieved, the corresponding 100th winning outcome is immediately presented to the player without waiting for the player to select the bonus game button 302. In such an embodiment, the player can accumulate for later redemption a maximum of 99 winning outcomes. In other embodiments, a smaller, greater, or no limit at all can be imposed.

In an embodiment, the winning outcome itself includes a triggering symbol, such as the "Can't Lose" symbol. Thus, when the player redeems a "Can't Lose" outcome via the bonus game button 304, another "Can't Lose" symbol is displayed. In this embodiment, the second "Can't Lose" outcome is pre-mapped to another winning outcome, and the awards from both outcomes are combined together to yield a total award. The number of times the retriggering occurs consecutively can be controlled via software. One consecutive retriggering is preferably enough, although two or more consecutive pre-mapped retriggerings are also contemplated. An example of retriggering is shown below in connection with Tables 1 and 2.

In an embodiment, there is one triggering symbol 300 on multiple (four according to an embodiment) reel stop positions or the reel. The weighting of the triggering symbol in a specific embodiment corresponds to 4 out of 88 virtual reel stop positions, which means that there is a 1:22 chance of landing on the triggering symbol. This weighting is exemplary only. The point is that the present invention allows the gaming manufacturer to control the mathematical distribution of weightings because the "Can't Lose"-to-winning outcome mappings are predetermined. When the mapping table is generated, the mappings can be manipulated until a desired mathematical distribution is achieved. Because each "Can't Lose" outcome is associated with an award, just like any other winning outcome, the mathematics required to create the desired distribution is greatly simplified versus traditional systems in which the award associated with a "Can't Lose" outcome is randomly generated at the time the "Can't Lose" outcome is redeemed.

An exemplary table, which is purely illustrative only and by no means restrictive, of a portion of a mapping according to a specific embodiment of the present invention is provided below. In the exemplary table provided below, there are a total of 3 reels, and a total of 82 possible reel stop positions on reel #1, 84 possible reel stop positions on reel #2, and 88 possible reel stop positions on reel #3. The total number of combinations that have to be mapped depends upon the number of virtual reel stop positions. For example, if reels 1 and 2 have a total of 82 and 84 virtual reel stop positions, respectively, and there is one triggering reel stop position on the third reel, there are a total of 82×84 or 6,888 possible combinations for each triggering reel stop position. If there are four triggering reel stop positions in the third reel, there can be up to 6,888×4 possible combinations or 27,552 combinations.

TABLE 1

"Can't Lose" outcomes mapped to winning outcomes

| Combo no. | "Can't Lose" outcome triggering a guaranteed winning outcome Reel 1 | Reel 2 | Reel 3 | Winning outcome corresponding to "Can't Lose" outcome Reel 1 | Reel 2 | Reel 3 | "Can't Lose" Payout Credits |
|---|---|---|---|---|---|---|---|
| 0 | 0 | 0 | 32-35 | 9 | 11 | 8 | 2400 |
| 1-3 | 0 | 1-3 | 32-35 | 9 | 40 | 8 | 800 |
| 4-5 | 0 | 4-5 | 32-35 | 40 | 11 | 40 | 200 |
| . . . | . . . | . . . | . . . | . . . | . . . | . . . | . . . |
| 1020 | 12 | 12 | 32-35 | 36 | 81 | 32* | 10 |
| . . . | . . . | . . . | . . . | . . . | . . . | . . . | . . . |

In Table 1, reel stop positions 32-35 correspond to a "Can't Lose" symbol. The "Combo no." column is a number corresponding to each combination mapping in the table. For the sake of simplicity, combination numbers 1-3 and 4-5 have been lumped together. The next three columns correspond to each of the reel stop positions on the three reels. The third reel has a "Can't Lose" symbol on reel stop positions 32-35. Note that one of the winning outcomes (asterisked) corresponds to reel stop position 32, which is one of the four positions that trigger a winning outcome. In this situation, the winning outcome is mapped to another winning outcome, and the payout for both outcome is summed, as indicated in the exemplary table below:

ning outcome corresponding to the "Can't Lose" outcome represented by reel stop positions (0, 0, 33). The corresponding winning outcome is represented by reel stop positions (9, 11, 8), which results in a payout of 2400. The controller 34 stores data indicative of the winning outcome in a memory such as the system memory 36 or in a memory in the external systems 50. In an embodiment, the data can be in the form of the reel stop positions along with the corresponding payout to be awarded when the winning outcome is redeemed by the player. In another embodiment, the data can be a value representing a particular mapping, such as combination mapping number 1020 shown in Table 1. The data is stored along with data representing other winning outcomes the player accumulates during play until the player exercises an option to redeem one or more of the winning outcomes.

When the player exercises an option, such as by selecting the bonus game button 302, to redeem the winning outcome represented by reel stop positions (9, 11, 8), the reels are spun (or are made to appear to spin in the case of video reels) until the reel stop positions (9, 11, 8) and the payout of 2400 credits are presented to the player such as by incrementing a win meter 314 on the primary display 14. One or more symbols corresponding to these positions are visually presented to the player. In an embodiment, the reels, when they are spinning to present a winning outcome, are illuminated in a different color to visually indicate to the player that a bonus outcome is being presented. Other visual, audible, and/or tactile indicia can be used to visually, audibly, and/or tactilely differentiate to the player between a spin resulting in a "Can't Lose" outcome (FIG. 3) and a spin resulting in a winning outcome (FIG. 5) and a spin resulting in a retriggered winning outcome (Table 2).

Note that the gaming machine 10 of the present invention can include any number of reels, such as three or five, any number of reel stop positions on each reel, and any number of triggering symbols (or reel stop positions corresponding to triggering symbols).

In an alternate embodiment, instead of mapping specific reel-stop position combinations in a table, one or more formulas can be stored. In this embodiment, the reel stop positions corresponding to a "Can't Lose" outcome are inputted

TABLE 2

Winning outcomes mapped to retriggered winning outcomes

| Winning outcome Reel 1 | Reel 2 | Reel 3 | Payout Credits | Retriggered winning outcome Reel 1 | Reel 2 | Reel 3 | Payout Credits | Total Payout Credits |
|---|---|---|---|---|---|---|---|---|
| . . . | . . . | . . . | . . . | . . . | . . . | . . . | . . . | . . . |
| 36 | 81 | 32 | 10 | 78 | 76 | 48 | 5 | 15 |
| . . . | . . . | . . . | . . . | . . . | . . . | . . . | . . . | . . . |

Thus, when the winning outcome includes a reel stop position corresponding to a triggering symbol, the player is awarded an enhanced pay based on a mathematical relationship (addition, multiplication, algebraic formula) between the winning and retriggered winning outcomes. In Table 2, the player is awarded a total of fifteen credits, which represents the sum of ten credits from the initial winning outcome and five credits from the retriggered winning outcome.

Referring to the above exemplary Tables 1 and 2, if the player spins the reels, and the reels stop at positions (0, 0, 33), respectively, the controller 34 looks up the table for the win-into a formula, which generates a corresponding winning outcome. The formula or the resulting reel stop positions corresponding to the winning outcome are stored in a memory until the player redeems that winning outcome.

Figure 6:
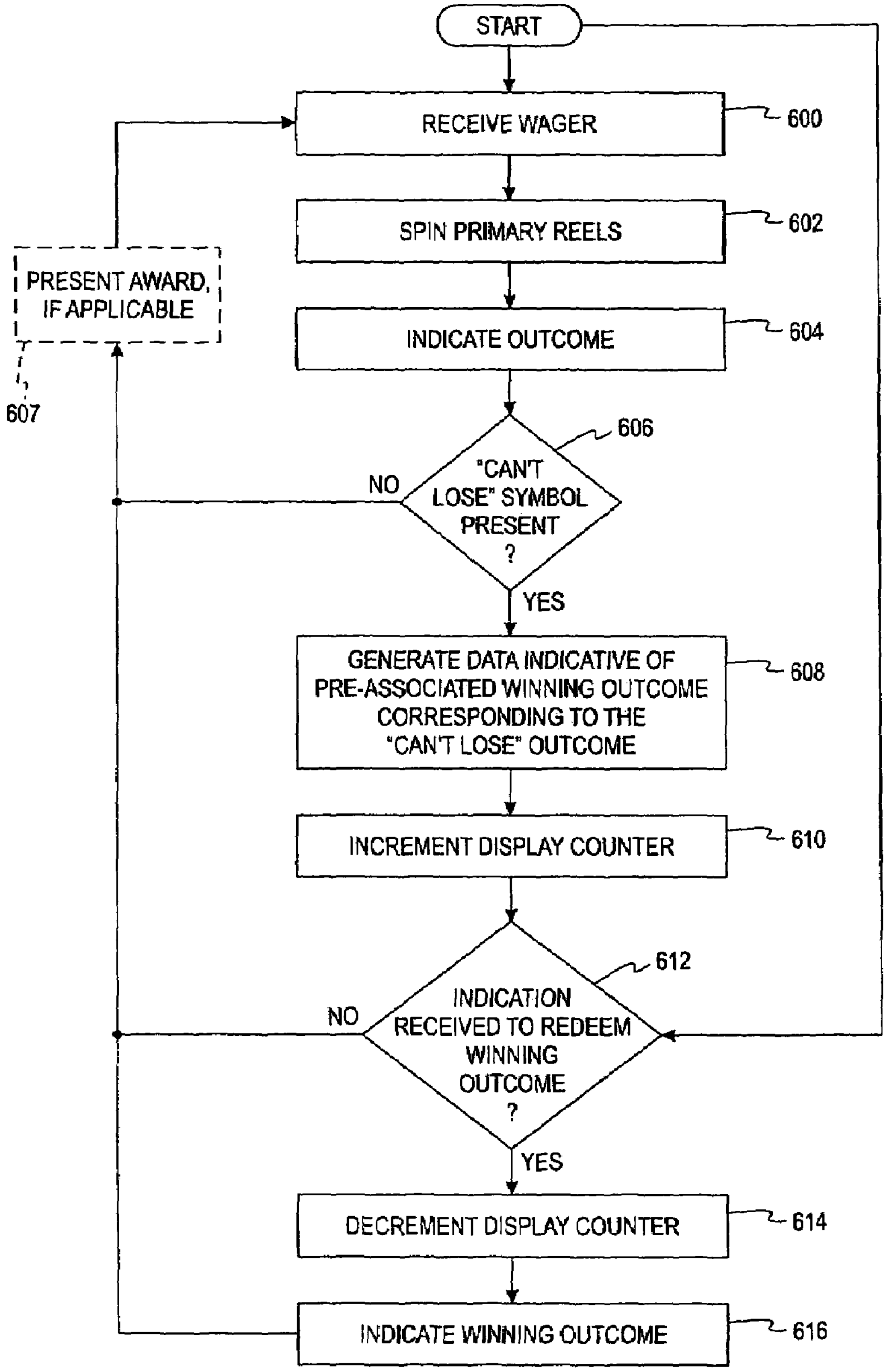
FIG. 6 is a flowchart of a winning outcome accrual and redemption routine that can be performed during operation of the gaming machine of FIG. 1.

Turning now to FIG. 6, there is shown a flowchart of a winning outcome accrual and redemption routine that can be performed during operation of the gaming machine of FIG. 1 under the control of the controller 34 executing instructions stored on a computer readable storage medium. In an embodiment, a wager is received (600) and a credit meter 312 is incremented to reflect the amount of wager received. A set of primary reels are spun (or caused to appear to spin) (602) in response to the player's selecting a spin reels button 306. An outcome is indicated to the player represented by a combination of symbols along the payline 32 (604). As shown in FIG. 3, the outcome can be a guaranteed win triggering outcome in which a triggering symbol on one of the reels has stopped along the payline 32.

When the "Can't Lose" triggering symbol 300 is not present along the payline 32 (606), an award, if applicable, is awarded to the player (607), and the routine is repeated. Otherwise, if a triggering symbol 300 is present along the payline 32 (606), the controller 34 generates data indicative of a pre-associated winning outcome that corresponds to the guaranteed win triggering outcome. The pre-association is typically carried out at or before the moment when the triggering symbol 300 is presented to the player, such as before a wager is received (600). As mentioned above, the data can be in the form of the reel stop positions corresponding to the winning outcome or in the form of a formula that generates a corresponding winning outcome based on the guaranteed win triggering outcome. The data can be stored in the system memory 36 or, alternatively, in a memory in the external systems 50. The display counter 304 is incremented (610), but, in other embodiments, any other suitable information display system can be employed to inform the player of the number of accrued "guaranteed" wins.

The controller 34 determines whether an indication has been received from the player to redeem a winning outcome (612), such as by actuating the bonus game button 302. If no such indication is received, the routine is repeated. Note that no award is presented to the player (607) because no indication was received from the player to redeem a winning outcome.

If the controller 34 receives an indication from the player to redeem a winning outcome, the display counter 304 is decremented (614), and the winning outcome is indicated to the player (616). Note that the decrementing (614) and indicating (616) can be performed in any order. In the event that the winning outcome is a retriggered winning outcome (i.e., the winning outcome includes a triggering symbol), as described above, the retriggered winning outcome is presented to the player (616).

The winning outcome accrual and redemption routine of FIG. 6 can also be initiated by receiving an indication from the player to redeem a winning outcome (612), such as when the player, before initiating game play at the gaming machine 10, redeems one or more winning outcomes. The gaming machine 10 may or may not be the gaming machine at which the player accrued the winning outcomes. As noted above, the winning outcomes can be accrued and redeemed at different gaming machines.

Any of the foregoing embodiments may further include one or more game enhancement symbols, which can be displayed on an additional reel. Each game enhancement symbol represents a game enhancement parameter, such as, for example, "RANDOM MULTIPLIER," "AUTOMATIC NUDGE," "UPGRADE," "DIFFERENT PAYTABLE," "EXTRA WILD," "SCATTER," "RIGHT-TO-LEFT," "RE-SPIN," "MORPH," "INCREASED WAGER," "EXTRA SYMBOL," and "SYMBOL MOVEMENT." Further details of the foregoing game enhancement parameters are disclosed in co-pending U.S. provisional patent application 60/655,192 entitled, "Wagering Game For Implementing Game-Enhancement Parameters With a Guaranteed Bonus".

Just as each "Can't Lose" outcome is pre-mapped to a corresponding winning outcome, so too each winning outcome is pre-mapped to a corresponding game enhancement parameter. Thus, when the "Can't Lose" outcome is indicated to the player, a corresponding game enhancement parameter is already determined and stored in a memory. The game enhancement parameter increases the likelihood that the player's guaranteed award will be increased. When the player redeems the accumulated winning outcome, the game enhancement parameter is indicated to the player. In accordance with the present invention, the game enhancement parameter was already pre-determined when the "Can't Lose" outcome was accrued earlier.

In another embodiment, one or more free spins can be awarded to the player, and each free spin may be associated with a particular game enhancement parameter, such as any of those listed above. Any of the reels as described herein may include a "free spin" symbol that may also depict a game enhancement parameter. For example, a "free spin" symbol may read "RANDOM MULTIPLIER free spin" or "UPGRADE free spin." Such "free spin" symbols may be located at various locations on the reels for each of the game-enhancement parameters. In accordance with the present invention, when an outcome includes a "free spin" symbol (a "free spin" triggering outcome), the corresponding outcome associated with the "free spin" symbol (the "free spin" outcome) is pre-mapped in a table and stored in a memory for later retrieval when the player exercises an option to reveal the "free spin" outcome. Unlike the guaranteed win triggering outcome, the outcome that includes a "free spin" symbol is not necessarily a winning outcome, but can be a non-winning outcome.

Each of these embodiments and obvious variations thereof is contemplated as falling within the spirit and scope of the claimed invention, which is set forth in the following claims.

What is claimed is:

1. A computer-implemented method of conducting a wagering game on a gaming machine, comprising:

associating, using a controller, a plurality of mapped outcomes with a plurality of triggering outcomes, each of said plurality of triggering outcomes being indicated by at least a triggering symbol;

initiating, using said controller, a plurality of plays of said wagering game on said gaming machine upon detecting a respective wager for each of said plays, said initiating including randomly selecting, for each of said plays, a respective game outcome from a plurality of game outcomes that include said plurality of triggering outcomes;

after said associating, and in response to any of said randomly selected game outcomes being one of said plurality of triggering outcomes, storing in a memory an indication of a corresponding first one of said mapped outcomes associated with said one of said plurality of triggering outcomes; and incrementing, using said controller, a counter in response to any of said randomly selected game outcomes corresponding to any of said plurality of triggering outcomes;

in response to an option exercised by a player of said wagering game at any time chosen by the player during or after any of said plays of said wagering game, and after said storing, displaying, on a video display of said gaming machine, said corresponding first one of said mapped outcomes based on said associating so as to be redeemed by the player.

2. The method of claim 1, wherein said triggering symbol corresponds to at least one reel stop position.

3. The method of claim 1, wherein each of said triggering outcomes is representative of a combination of reel stop positions that includes at least one reel stop position associated with said triggering symbol.

4. The method of claim 1, further comprising associating at least one of said plurality of mapped outcomes with a retriggered outcome, said at least one of said mapped outcomes including said triggering symbol.

5. The method of claim 1, further comprising decrementing said counter in response to said player exercising said option to redeem any of said randomly selected game outcomes corresponding to any of said plurality of triggering outcomes.

6. The method of claim 1, further comprising accessing said memory, as said player is exercising said option, to retrieve said first corresponding first mapped outcome.

7. The method of claim 1, wherein said corresponding first one of said mapped outcomes is a winning outcome.

8. A computer-implemented method of conducting a wagering game on a gaming machine, comprising:

receiving a wager to initiate a first play of a wagering game on said gaming machine;

associating, using a controller, a plurality of triggering outcomes with respective mapped outcomes stored in a memory of said gaming machine, each of said plurality of triggering outcomes being represented by a combination of reel stop positions that includes at least one triggering reel stop position;

displaying on said gaming machine a plurality of reels, wherein said reel stop positions represent virtual stop positions on each of said reels;

randomly selecting during said first play of said wagering game a game outcome from a plurality of game outcomes that include said triggering outcomes;

displaying on said gaming machine said randomly selected game outcome using said reels;

receiving another wager to initiate a second play of said wagering game on said gaming machine; and after said receiving said another wager, presenting a first one of said mapped outcomes to said player to be redeemed by said player in response to an option exercised by a player of said wagering game at any time during said first play or said second play or any subsequent play of said wagering game.

9. A computer readable storage medium encoded with instructions for directing said gaming machine to perform the method of claim 1.

10. The method of claim 8, further comprising causing each of said plurality of reels to appear to spin and to stop at a first one of said triggering outcomes on a video display of said gaming machine, wherein said presenting includes causing each of said plurality of reels to appear to spin and to stop at said first one of said mapped outcomes.

11. The method of claim 8, wherein said plurality of reels are mechanical reels or video reels.

12. The method of claim 8, wherein said associating includes storing in said memory a table having first data indicative of said plurality of mapped outcomes with second data indicative of said plurality of triggering outcomes.

13. The method of claim 8, wherein each of said plurality of triggering outcomes represents an accrued award to said player, said accrued award being redeemable by said player at said player's option in the same order in which said accrued award was accrued.

14. The method of claim 8, wherein at least some of said outcomes are identical.

15. The method of claim 8, wherein said outcomes include winning outcomes.

16. A computer readable storage medium encoded with instructions for directing said gaming machine to perform the method of claim 8.

17. A gaming machine for playing a wagering game, comprising:

a wager-input device for receiving a wager associated with a wagering game;

a memory storing a plurality of mapped outcomes that are associated with a plurality of triggering outcomes;

a display for displaying symbols indicating a randomly selected outcome of said wagering game selected from a plurality of outcomes, said plurality of outcomes including at least two triggering outcomes that award additional game play at a time selectable by a player of said wagering game, said additional game play providing a redeemable outcome corresponding to one of the mapped outcomes; and a special-event input device for initiating said additional game play in response to activating said special-event input device, wherein said redeemable outcome is predetermined before said initiation and is correlated to at least one of said symbols used for indicating said triggering outcomes; and a controller programmed to increment a counter in response to said randomly selected outcome corresponding to any of said triggering outcomes and store in said memory an indication of said mapped outcome that corresponds to said randomly selected outcome, and cause said redeemable outcome to be displayed on said display after said symbols indicating said randomly selected outcome are displayed.

18. The gaming machine of claim 17, wherein said symbols are displayed on a plurality of reels, each of said reels having a plurality of reel stop positions.

19. The gaming machine of claim 18, wherein said symbols are displayed on at least some of said reel stop positions.

20. The gaming machine of claim 17, wherein said memory includes a lookup table, said lookup table including entries representing all possible triggering outcomes, each of said triggering outcomes being correlated with a corresponding redeemable outcome, and with entries representing a corresponding payout amount for each of said redeemable outcomes, wherein said a out amount could be zero.

21. The gaming machine of claim 17, wherein said memory includes a lookup table, said lookup table including entries representing all possible triggering outcomes, each of said triggering outcomes being associated with a corresponding redeemable outcome, said lookup table further including data indicative of those of said symbols to be used in displaying each of said redeemable outcomes.

22. The gaming machine of claim 17, wherein said redeemable outcome represents a guaranteed winning payout.

23. The gaming machine of claim 17, wherein said redeemable outcome represents a game enhancement parameter.

* * * * *

UNITED STATES PATENT AND TRADEMARK OFFICE

CERTIFICATE OF CORRECTION

PATENT NO. : 7,677,968 B2
APPLICATION NO. : 11/361285
DATED : March 16, 2010
INVENTOR(S) : Brad Schultz et al.

It is certified that error appears in the above-identified patent and that said Letters Patent is hereby corrected as shown below:

In Claim 20, Column 14, Line 48, change "comes, wherein said a out amount could be zero." to "comes, wherein said payout amount could be zero."

Signed and Sealed this

First Day of June, 2010

David J. Kappos
*Director of the United States Patent and Trademark Office*